(12) United States Patent
Pola et al.

(10) Patent No.: US 11,722,051 B1
(45) Date of Patent: Aug. 8, 2023

(54) SYNCHRONVERTER POWER CONTROL DURING UNBALANCED GRID CONDITIONS

(71) Applicant: King Abdulaziz University, Jeddah (SA)

(72) Inventors: Saad Pola, Jeddah (SA); Maher Azzouz, Jeddah (SA); Hatem Sindi, Jeddah (SA)

(73) Assignee: KING ABDULAZIZ UNIVERSITY, Jeddah (SA)

( * ) Notice: Subject to any disclaimer, the term of this patent is extended or adjusted under 35 U.S.C. 154(b) by 0 days.

(21) Appl. No.: 17/685,770

(22) Filed: Mar. 3, 2022

(51) Int. Cl.
*H02M 1/12* (2006.01)
*H02J 3/18* (2006.01)
(Continued)

(52) U.S. Cl.
CPC ............... *H02M 1/12* (2013.01); *G05B 6/02* (2013.01); *H02J 3/18* (2013.01); *H02J 3/241* (2020.01); *H02M 1/0009* (2021.05); *H02M 7/42* (2013.01)

(58) Field of Classification Search
CPC ........ G05B 6/02; H02M 1/0009; H02M 1/12; H02M 7/42; H02J 3/001–00125;
(Continued)

(56) References Cited

U.S. PATENT DOCUMENTS 10,615,716 B2   4/2020  Zhong
2014/0067138 A1*  3/2014  Rodriguez Cortes ... H02J 3/381
                                                            700/286

(Continued)

FOREIGN PATENT DOCUMENTS

CN      108808704 B     7/2021

OTHER PUBLICATIONS

J. O. M. B. de Almeida, et al., "Three-phase photovoltaic inverters during unbalanced voltage sags: Comparison of control strategies and thermal stress analysis," 2016 12th IEEE International Conference on Industry Applications, Curitiba, PR, Brazil, 2016, pp. 1-7, doi: 10.1109/INDUSCON.2016.7874564. (Year: 2016).*

(Continued)

*Primary Examiner* — Fred E Finch, III
(74) *Attorney, Agent, or Firm* — WCF IP

(57) ABSTRACT

Methods and systems for a synchronverter power control during unbalanced grid conditions is disclosed. The system includes a synchronverter coupled with a power supply grid, a power reference generator, configured to receive a terminal voltage measurement vector $v_t$ and a current measurement vector i from the synchronverter, and generate an active power $P_f$ and a reactive power $Q_f$, a synchronverter control unit connected to the power reference generator and configured to process the active power $P_f$ and the reactive power $Q_f$ and generate an electromotive force (EMF) vector e, and an active and reactive power control unit, connected between the synchronverter control unit and the synchronverter, configured to receive the electromotive force (EMF) vector e and the terminal voltage measurement vector $v_t$, and regulate the current measurement vector i to eliminate power oscillations and current harmonics in the synchronverter during unbalanced grid conditions.

20 Claims, 10 Drawing Sheets

(51) Int. Cl.
*H02J 3/24* (2006.01)
*H02M 1/00* (2006.01)
*G05B 6/02* (2006.01)
*H02M 7/42* (2006.01)

(58) Field of Classification Search
CPC ........ H02J 3/01; H02J 3/16; H02J 3/18; H02J 3/1842; H02J 3/1885; H02J 3/24; H02J 3/241; H02J 3/26; H02J 3/38; H02J 3/381; H02J 3/40; H02J 3/46–50; H02J 5/00; Y02E 40/40; Y02E 40/50
See application file for complete search history.

(56) References Cited

U.S. PATENT DOCUMENTS

| | | | | |
|---|---|---|---|---|
| 2014/0152292 | A1* | 6/2014 | Andresen | H02S 50/00 324/707 |
| 2019/0190276 | A1* | 6/2019 | Liu | H02J 3/01 |
| 2019/0245458 | A1* | 8/2019 | Wang | H02M 7/4826 |
| 2021/0249862 | A1* | 8/2021 | Awal | H03B 5/02 |

OTHER PUBLICATIONS

M. Zhu, L. Hang, G. Li and X. Jiang, "Protected Control Method for Power Conversion Interface Under Unbalanced Operating Conditions in AC/DC Hybrid Distributed Grid," in IEEE Transactions on Energy Conversion, vol. 31, No. 1, pp. 57-68, Mar. 2016, doi: 10.1109/TEC.2015.2480757. (Year: 2016).*

S. F. Zarei, H. Mokhtari, M. A. Ghasemi, S. Peyghami, P. Davari and F. Blaabjerg, "Control of Grid-Following Inverters Under Unbalanced Grid Conditions," in IEEE Transactions on Energy Conversion, vol. 35, No. 1, pp. 184-192, Mar. 2020, doi: 10.1109/TEC.2019.2945699. (Year: 2020).*

Prasanna Piya "Grid fault ride-through capability of voltage-controlled inverters for distributed generation" May 5, 2017.

Weiyi Zhang "Control of grid connected power converters with grid support functionalities" May 2017.

* cited by examiner

SYNCHRONVERTER POWER CONTROL DURING UNBALANCED GRID CONDITIONS

TECHNICAL FIELD

The present disclosure relates to inverters and, more specifically, relates to a synchronverter power control during unbalanced grid conditions.

BACKGROUND

Standard inverters are known to be having low inertia. If there are faults or sudden changes in load leading to transient periods, the standard inverters follow changes rapidly. As a result, grids taking support of the standard inverters may experience a worser condition. To overcome the deficiencies of standard inverters, Synchronverters (SVs) are introduced. The SVs are inverters with defined control strategy to behave as synchronous generators (SGs) to avoid traditional inverters' unwanted low inertia behaviors. The SVs may operate in a connected mode or in an islanded mode from a hosting power grid. However, generic SVs are not capable of providing safe and reliable operation during unbalanced faults or grid conditions. Consequently, the SVs may generate currents that may exceed their nominal values, inject active and reactive power with oscillations at twice the grid's fundamental frequency.

SUMMARY

In one aspect of the present disclosure, a system for synchronverter power control during unbalanced grid conditions is disclosed. Methods and systems for a synchronverter power control during unbalanced grid conditions is disclosed. The system includes a synchronverter coupled with a power supply grid, a power reference generator, configured to receive a terminal voltage measurement vector $v_t$ and a current measurement vector i from the synchronverter, and generate an active power $P_f$ and a reactive power $Q_f$, a synchronverter control unit connected to the power reference generator and configured to process the active power $P_f$ and the reactive power $Q_f$ and generate an electromotive force (EMF) vector e, and an active and reactive power control unit, connected between the synchronverter control unit and the synchronverter, configured to receive the electromotive force (EMF) vector e and the terminal voltage measurement vector $v_t$, and regulate the current measurement vector i to eliminate power oscillations and current harmonics in the synchronverter during unbalanced grid conditions.

In another aspect, a method for synchronverter power control is disclosed. The method includes electrically coupling a synchronverter coupled with a power supply grid, generating an active power $P_f$ and a reactive power $Q_f$ through a power reference generator based on a terminal voltage measurement vector $v_t$ and a current measurement vector i from the synchronverter, generating an electromotive force (EMF) vector e through a synchronverter control unit by processing an active power $P_f$ and a reactive power $Q_f$, and regulating the current measurement vector i to eliminate power oscillations and current harmonics in the synchronverter during unbalanced grid conditions through an active and reactive power control unit, based on the electromotive force (EMF) vector e and the terminal voltage measurement vector $v_t$.

The foregoing as well as other features and advantages of the present disclosure will be more fully understood from the following description, examples, and claims.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

It should be appreciated by those skilled in the art that any diagram herein represents conceptual views of illustrative systems embodying the principles of the present disclosure.

DETAILED DESCRIPTION

Reference will now be made in detail to specific embodiments or features, examples of which are illustrated in the accompanying drawings. A skilled artisan will appreciate that various alternate embodiments and forms may be prepared. Examples, therefore, given are only for illustration purposes without any intention to restrict the embodiments to a given set of examples. Specific functional aspects are provided merely to enable a person skilled in the art to perform the invention and should not be construed as limitations of the invention. Any method steps, and processes described herein are not to be construed as necessarily requiring their performance in the particular order discussed or illustrated, unless specifically identified as an order of performance. It is also to be understood that additional or alternative steps may be employed, unless otherwise indicated.

The use of the singular herein includes the plural (and vice versa) unless specifically stated otherwise. The use of the terms "include," "includes", "including," "have," "has," or "having," "comprise," "comprises," "comprising" or the like should be generally understood as open-ended and non-limiting unless specifically stated otherwise. It is understood that the order of steps or order for performing certain actions can be changed so long as the intended result is obtained. Moreover, two or more steps or actions may be conducted simultaneously. As used herein, the term "about" or "between" refers to a ±20% to ±10% variation from the nominal value unless otherwise indicated.

Embodiments of the present disclosure are directed to methods and systems for synchronverter power control during unbalanced grid conditions. The disclosure may equip the Synchronverters (SVs) with fault ride-through (FRT) units to avoid any adverse impact of unbalanced grid conditions and maintain a reliable SV operation. The FRT units are configured to eliminate active and reactive power oscillations problems and ensure current generation is within the defined inverter ratings. The FRT units maintain SVs' intrinsic features, guarantee a seamless transition during faults, and facilitate SVs integration in microgrids.

Figure 1A:
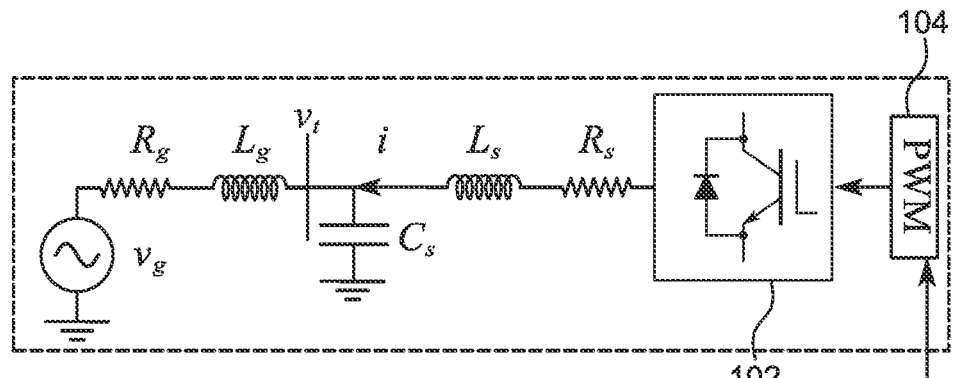
FIG. 1(a) illustrates a three-phase inverter connected to a hosting grid at a point of common coupling (PCC).
Figure 1B:
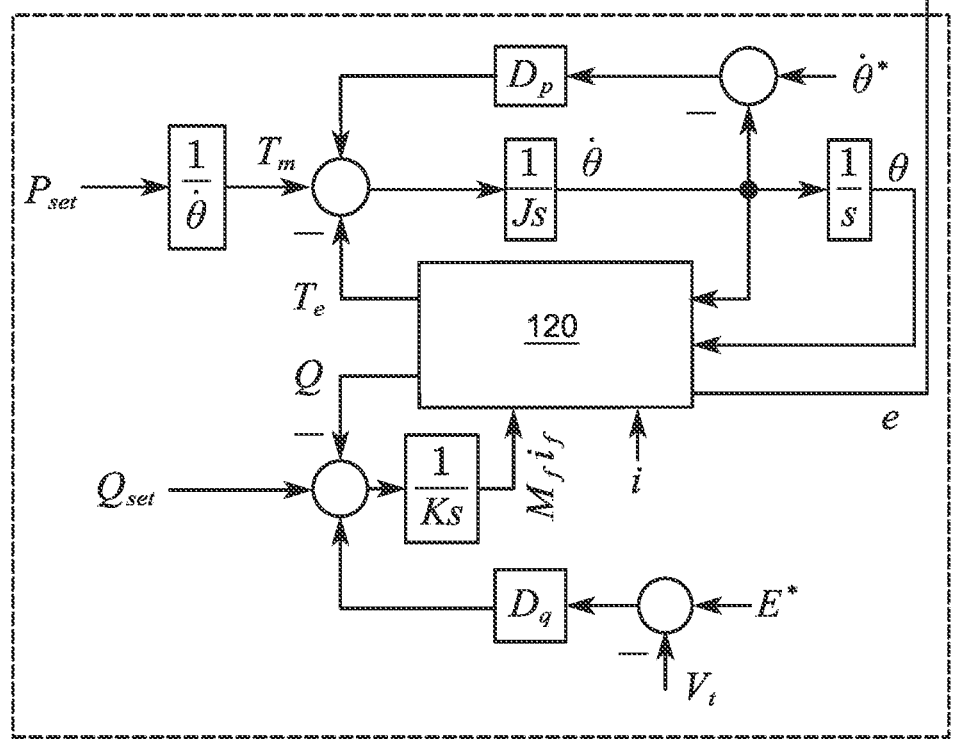
FIG. 1(b) illustrates a generic Synchronverters (SV) control unit.

FIG. 1(a) and FIG. 1(b) illustrate a known Synchronverters (SVs) topology. FIG. 1(a) is a three-phase inverter connected to a hosting grid at a point of common coupling (PCC). Elements shown in FIG. 1(a): $R_s$, $L_s$ and $C_s$ represent an interfacing filter's resistive, inductive, and capacitive components, respectively. Further, $V_g$, $R_g$, and $L_g$ are an equivalent grid voltage magnitude, resistance, and inductance, respectively. SV control unit (illustrated in FIG. 1(b)) is configured to receive a terminal voltage measurement vector $v_t$, and a current measurement vector i to produce an electromotive force (EMF) vector 'e' that is normalized to generate a pulse width modulation (PWM) signals to operate the inverter switches 102. In an example, a PWM circuit 104 may be used to generate the PWM signals. The vector e may have a magnitude 'E' that is regulated through a reactive power loop and an active power loop. E is represented by:

$$E = M_f i_f \dot{\theta}; \tag{1}$$

where $M_f i_f$ is the virtual mutual field multiplied by the virtual field current. The $M_f i_f$ is determined by following equation:

$$M_f i_f = \frac{1}{Ks}[Q_{set} - Q + D_q(E^* - V_t)]; \tag{2}$$

where $V_t$ is $v_t$ magnitude, K is a reactive power regulating coefficient, $Q_{set}$ is a setpoint for a reactive power, Q is a produced reactive power by the SV, $D_q$ is a voltage droop coefficient that regulates Q generation for a specific change in $V_t$, and $E^*$ is a voltage magnitude setpoint. The produced Q and $D_q$ are provided by:

$$Q = -\dot{\theta} M_f i_f \langle i, \widetilde{\cos}\theta \rangle \tag{3}$$

$$D_q = -\frac{\Delta Q}{\Delta V_t} \tag{4}$$

On the other hand, SV angular frequency $\dot{\theta}$ is regulated by the following equation:

$$\dot{\theta} = \frac{1}{Js}\left[\frac{P_{set}}{\dot{\theta}^*} - T_e - D_p(\dot{\theta}^* - \dot{\theta})\right]; \tag{5}$$

where $P_{set}$ is an active power setpoint, $\dot{\theta}^*$ is the angular frequency setpoint, J is a virtual inertia, $T_e$ is an electromagnetic torque, and $D_p$ is a frequency droop coefficient. $D_q$, $D_p$ stimulates the SV to generate a certain amount of $T_e$ denoted as $\Delta T_e$ and thus active power for each specific change in $\dot{\theta}$ denoted as $\Delta \dot{\theta}$ as shown below as:

$$T_e = M_f i_f \langle i, \widetilde{\sin}\theta \rangle \tag{6}$$

$$D_p = -\frac{\Delta T_e}{\Delta \dot{\theta}}; \tag{7}$$

where $\widetilde{\sin}\theta$ is a balanced three-phase sinusoidal. The e vector is represented as:

$$e = E\widetilde{\sin}\theta \tag{8}$$

Figure 2A:
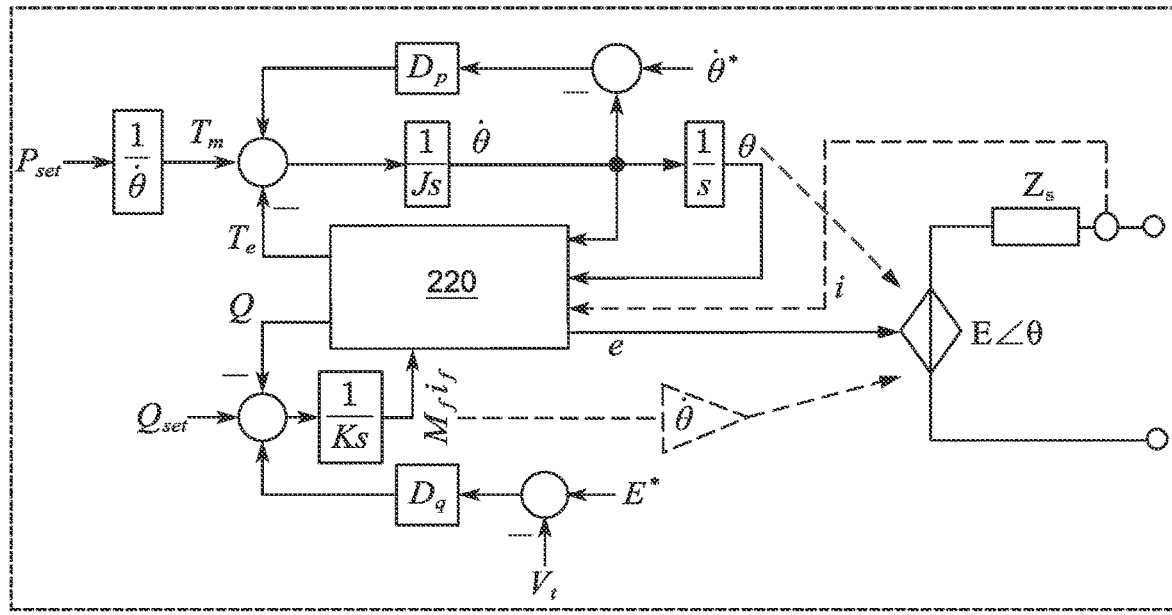
FIG. 2(a) illustrates a detailed voltage source model of the SV control unit.
Figure 2B:
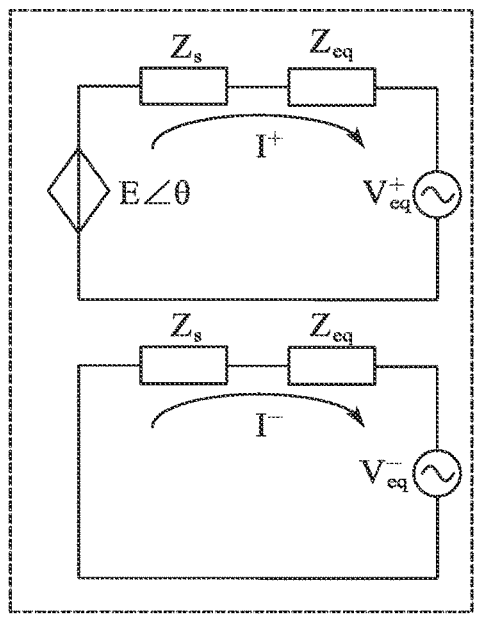
FIG. 2(b) illustrates a positive and negative sequence models of the SV control unit.

The SV control unit as illustrated in FIG. 1(b) includes a controller 120 which is implemented based at least in part on Equations (3), (6) and (8). It is apparent that the SV holds a controlled voltage source model with a magnitude E that and phase θ that are dependent on $P_{set}$ and $Q_{set}$ values. Also, it can be seen from FIG. 1(b) that the current generation is not bounded by limits or controlled directly through a control loop to follow a pre-defined value. Thus, a positive sequence model is a controlled voltage source in series with an impedance, and a negative sequence is a same impedance used for the positive sequence, as illustrated in FIG. 2(a). FIG. 2(a) includes a controller 220 that is substantially similar to the controller 120 and implements the logic based at least in part upon Equations (3), (6) and (8). If the SV is under a fault condition, the periodic component of the current flowing in phase a is expressed:

$$i_a = \frac{E_a \angle \theta - V_{ta} \angle \theta_t}{Z_s \angle \theta_s} \tag{9}$$

where $\theta_t$, $Z_s$, and $\theta_s$ are a terminal voltage phase, a filter impedance magnitude, and an angle, respectively. From equation (9), it is apparent that the current depends on the voltage difference between SV and the measured $V_{ta} \angle \theta_t$ as well as the filter impedance $Z_s \angle \theta_s$. Thus, the current may exceed the inverter's ratings and an interfacing filter during unbalanced conditions, which raises a requirement for limiting the current to avoid any damages.

According to instantaneous power theory, SVs generated P and Q are expressed as $$P = v_t \cdot i$$

$$Q = v_{t\perp} \cdot i \tag{10}$$

where the operator (.) may represent the dot product of vectors, and the subscript (⊥) may denote the orthogonal version of $v_t$. Both $v_t$ and i may be redefined by applying symmetrical component theory as given by:

$$v_t = v_t^+ v_t^-$$

$$i = i^+ + i^- \tag{11}$$

The superscripts (+) and (−) refer to positive and negative sequence components, respectively. By substituting (11) in (10), P and Q are rewritten as:

$$P = v_t^+ \cdot i^+ + v_t^- \cdot i^- + v_t^+ \cdot i^- + v_t^- \cdot i^+ \tag{12}$$

$$Q = v_{t\perp}^+ \cdot i^+ + v_{t\perp}^- \cdot i^- + v_{t\perp}^+ \cdot i^- + v_{t\perp}^- \cdot i^+ \tag{13}$$

Each of (12) and (13) include two terms, a constant term that is a result of $v_t$ and i interaction from a same sequence and an oscillatory term results from the v and i interaction from different sequences. The terms P and Q are defined as:

$$P_s = v_t^+ \cdot i^+ + v_t^- \cdot i^- \tag{14}$$

$$\tilde{P} = v_t^+ \cdot i^- + v_t^- \cdot i^+ \tag{15}$$

$$P = P_s + \tilde{P} \tag{16}$$

$$Q_s = v_{t\perp}^+ \cdot i^+ + v_{t\perp}^- \cdot i^- \tag{17}$$

$$\tilde{Q} = v_{t\perp}^+ \cdot i^- + v_{t\perp}^- \cdot i^+ \tag{18}$$

$$Q = Q_s + \tilde{Q} \tag{19}$$

where $P_s$ is a constant term of P which is usually equal to the active power setpoint, i.e., $P_{set}$. The $Q_s$ is a constant term of Q, which is equal to the reactive power setpoint $Q_{set}$. The oscillatory terms of P and Q are $\tilde{P}$ and $\tilde{Q}$, respectively, having a zero-mean value. During unbalanced conditions, the $\tilde{P}$ and $\tilde{Q}$ are not null since the negative sequence components of $v_t$ and i exist. As a result, it may be required to mitigate the effect of unbalanced grid conditions by reducing/eliminating $\tilde{P}$ and $\tilde{Q}$.

The problem of power oscillations and overcurrent generation is resolved for SVs as described henceforth. To significantly eliminate $\tilde{P}$ and $\tilde{Q}$, an instantaneous active and reactive power control (IARC) technique may be used. If i aligns with the $v_t$ leads to P generation. Conversely, the Q generation is performed when the i aligns with the $v_{t\perp}$. This concept is used to form the reference current that is essential to achieve IARC as following:

$$i^* = i_p^* + i_q^* \tag{20}$$

where i* is the three-phase reference current that performs the IARC function. $i_p^*$ is a three-phase component of i that is responsible for P generation. Similarly, $i_q^*$ is responsible for Q generation. $i_p^*$, and $i_q^*$ are expressed as:

$$i_p^* = g * v_t \tag{21}$$

$$i_q^* = b * v_{t\perp} \tag{22}$$

where g and b are the instantaneous conductance and susceptance, respectively. For SVs, g and b can be defined as:

$$g = P_s / |v_t|^2 \tag{23}$$

$$b = Q_s / |v_t|^2 \tag{24}$$

$$|v_t|^2 = |v_t^+|^2 + |v_t^-|^2 + 2|v_t^+||v_t^-|\cos(2\omega t + \phi^+ + \phi^-) \tag{25}$$

where $\phi^+$ and $\phi^-$ are the phases of $v_t^+$ and $v_t^-$, respectively. Based on the equations (20)-(24), the reference current that achieves IARC for SVs can be written as $$i^* = \frac{P_s * v_t + Q_s * v_{t\perp}}{|v_t^+|^2 + |v_t^-|^2 + 2|v_t^+||v_t^-|\cos(2\omega t + \phi^+ + \phi^-)} \tag{26}$$

From the equation (26), i* depends on $P_s$ and $Q_s$ that are generated internally in the SV unit, which is explained in the methodology section. Also, it is well known that the IARC has a trade-off between the oscillations and the generated current quality due to the existence of a cosine term in the denominator. Allowing the complete existence of the cosine term gives the highest degree of eliminating the oscillations. However, the corresponding generated current includes higher-order harmonic components, mainly the third harmonic component. This third harmonic component may be avoided by eliminating the cosine term, which leads to an average active and reactive power control (AARC) methods that ensures the delivery of $P_s$ and $Q_s$ equal to their corresponding setpoints, i.e., $P_{set}$ and $Q_{set}$, respectively. $i_p^*$ and $i_q^*$ for AARC are defined as:

$$i_p^* = G * v_t \tag{27}$$

$$i_q^* = B * v_{t\perp} \tag{28}$$

where G and B are the average value of the conductance and susceptance, respectively. The G and B are constant during unbalanced grid conditions since they do not exhibit oscillations as their instantaneous counterparts g and b. The G and B are given by:

$$G = P_s / v_{t\Sigma}^2 \tag{29}$$

$$B = Q_s / v_{t\Sigma}^2 \tag{30}$$

$$v_{t\Sigma} = \sqrt{|v_t^+|^2 + |v_t^-|^2} \tag{31}$$

With $v_{t\Sigma}$, which is the collective RMS value of $v_t$, the AARC reference current is expressed as:

$$i^* = \frac{P_s * v_t + Q_s * v_{t\perp}}{v_{t\Sigma}^2} = \frac{P_s * v_t + Q_s * v_{t\perp}}{|v_t^+|^2 + |v_t^-|^2} \quad (32)$$

The reference current provided in the equation (32) prevents the generation of higher-order components of the current; thus, resulting in a sinusoidal current generation. Also, the reference current in (32) is identical to (26) if the cosine term is removed.

The IARC and AARC may be concluded as a relation between the power oscillations that adversely affect the current quality. As described, the higher the oscillations are eliminated, the higher the current is distorted. Therefore, a comprehensive IARC (C-IARC) is described in the disclosure to eliminate the oscillations without affecting the current or its quality. The C-IARC as described herein is developed in an $\alpha\beta$ frame. $v_t$ can be represented in the $\alpha\beta$ frame as follows:

$$\begin{bmatrix} v_\alpha \\ v_\beta \end{bmatrix} = \frac{2}{3}\begin{bmatrix} 1 & -\frac{1}{2} & \frac{1}{2} \\ 0 & \frac{\sqrt{3}}{2} & -\frac{\sqrt{3}}{2} \end{bmatrix}\begin{bmatrix} v_{ta} \\ v_{tb} \\ v_{tc} \end{bmatrix} \quad (33)$$

where $v_{ta}$, $v_{tb}$, and $v_{tc}$, are the abc quantities of $v_t$, respectively. $v_\alpha$ and $v_\beta$ are the $\alpha\beta$ frame quantities of $v_t$, respectively. C-IARC involves the modification of the instantaneous power theory to avoid the drawbacks of IARC and AARC. The following expressions are express original instantaneous power theory and the modified instantaneous power theory, the active-power P and the reactive-power Q are defined by:

$$\begin{bmatrix} P \\ Q \end{bmatrix} = \frac{3}{2}\begin{bmatrix} v_\alpha & v_\beta \\ v_\beta & -v_\alpha \end{bmatrix}\begin{bmatrix} i_\alpha \\ i_\beta \end{bmatrix} \quad (34)$$

$$\begin{bmatrix} P \\ Q \end{bmatrix} = \frac{3}{2}\begin{bmatrix} v_\alpha & v_\beta \\ \hat{v}_\alpha & -\hat{v}_\beta \end{bmatrix}\begin{bmatrix} i_\alpha \\ i_\beta \end{bmatrix} \quad (35)$$

Equation (35) is the modified instantaneous power theory to estimate P and Q. Term $\hat{v}_a$ is a $\pi/2$ delayed version of $v_\alpha$ while $\hat{v}_\beta$ is a $\pi/2$ advanced version of $v_\beta$. The aforementioned delay can be achieved by using a compensation filter with a transfer function defines as:

$$F_d(s) = \frac{\omega_d^2}{s^2 + 2\xi\omega_c + \omega_d^2} \quad (36)$$

The quantity $\omega_d$ represents the delayed quantity frequency and $\omega_c$ is the filter cut-off frequency. $\xi$ is the filter damping, which can be set as 1 to ensure good filter damping. The $F_d(s)$ delays $v_\alpha$ by $\pi/2$ and the same $F_d(s)$ can advanced $\hat{v}_\beta$ by multiplying by (−1) as following:

$$\hat{v}_\alpha = v_\alpha F_d(S) \quad (37)$$

$$\hat{v}_{62} = -v_\beta F_d(S) \quad (38)$$

Consequently, the reference current $\alpha\beta$ frame quantities $\hat{i}_\alpha^*$ and $\hat{i}_\beta^*$ to perform the C-IARC can be derived as:

$$\begin{bmatrix} \hat{i}_\alpha^* \\ \hat{i}_\beta^* \end{bmatrix} = \frac{2}{3}\begin{bmatrix} v_\alpha & v_\beta \\ \hat{v}_\alpha & -\hat{v}_\beta \end{bmatrix}^{-1}\begin{bmatrix} P_s \\ Q_s \end{bmatrix} = \begin{bmatrix} \hat{i}_{\alpha(p)}^* + \hat{i}_{\alpha(q)}^* \\ \hat{i}_{\beta(p)}^* + \hat{i}_{\beta(q)}^* \end{bmatrix} \quad (39)$$

The $\hat{i}_{\alpha(p)}^*$ and $\hat{i}_{\beta(p)}^*$ are responsible for generating $P_s$ while $\hat{i}_{\alpha(q)}^*$ and $\hat{i}_{\beta(q)}^*$ are on the other hand, responsible for generating $Q_s$. Each sub-component of $\hat{i}_\alpha^*$ and $\hat{i}_\beta^*$ based in (39) are formulated as $$\hat{i}_{\alpha(p)}^* = \frac{2}{3}\frac{\hat{v}_\beta P_s}{v_\alpha \hat{v}_\beta + \hat{v}_\alpha v_\beta} \quad (40)$$

$$\hat{i}_{\alpha(q)}^* = \frac{2}{3}\frac{v_\beta Q_s}{v_\alpha \hat{v}_\beta + \hat{v}_\alpha v_\beta}$$

$$\hat{i}_{\beta(p)}^* = \frac{2}{3}\frac{\hat{v}_\beta P_s}{v_\alpha \hat{v}_\beta + \hat{v}_\alpha v_\beta}$$

$$\hat{i}_{\beta(q)}^* = -\frac{2}{3}\frac{v_\alpha Q_s}{v_\alpha \hat{v}_\beta + \hat{v}_\alpha v_\beta}$$

The reference currents described in equations (26), (32), and (40) achieve different FRT strategies. The C-IARC outperforms both the IARC and AARC. However, all of the aforementioned strategies have a common drawback; the unlimited current generation may lead to inverter damages. This damages may be prevented by having a current limiter. The current limiter may be designed by modifying $P_{set}$ and $Q_{set}$ to a form that ensures active and reactive power delivery during normal conditions and limited current generation during unbalanced grid conditions. As described earlier the $P_s$ and the $Q_s$ are equal to the $P_{set}$ and the $Q_{set}$ during normal and abnormal conditions. During unbalanced conditions, SVs generate high currents to compensate for the voltage drop. This high current ensures the generated P and Q are equal to $P_{set}$ and $Q_{set}$. Therefore, the inverter is subjected to damages due to the high current generation. In conclusion, changing $P_{set}$ and $Q_{set}$ to lower values may reduce the values of $P_s$ and $Q_s$ lower, and thus the generated current may be lower since the $P_s$ and $Q_s$ tracks the reference current of Equations (26), or (32), or (40), which all are affected by the value of $P_s$ and $Q_s$. The new active power setpoint $P_f$ and reactive power setpoint $Q_f$ are derived as:

$$P_f = \frac{3}{2}V_d I_d \quad (41)$$

$$Q_f = -\frac{3}{2}V_d I_q$$

where $V_d$, $I_d$, and $I_q$ are the d axis $v_t$ component, and dq axis components of i, respectively. During faults, the quantity $V_d$ is represented as:

$$V_d = (V^+ - V^-) \quad (42)$$

Also, $I_d$, and $I_q$ may be defined as a function of a maximum peak current $I_{max}$ as:

$$I_d = I_{max} \cos(\theta_i)$$

$$I_q = I_{max} \sin(\theta_i) \quad (43)$$

where $\theta_i$ is the angle of a required power factor. This new set of power references ensures the current does not exceed the pre-defined limit $I_{max}$ as demonstrated in the results sections.

The IARC, AARC, and C-IARC may be added in series to the generic SVs control unit. This configuration allows SVs to maintain their intrinsic features and guarantee a seamless transition without any switching to achieve a fault ride-through (FRT). As explained, IARC and AARC may be formulated and designed jointly.

Figure 3:
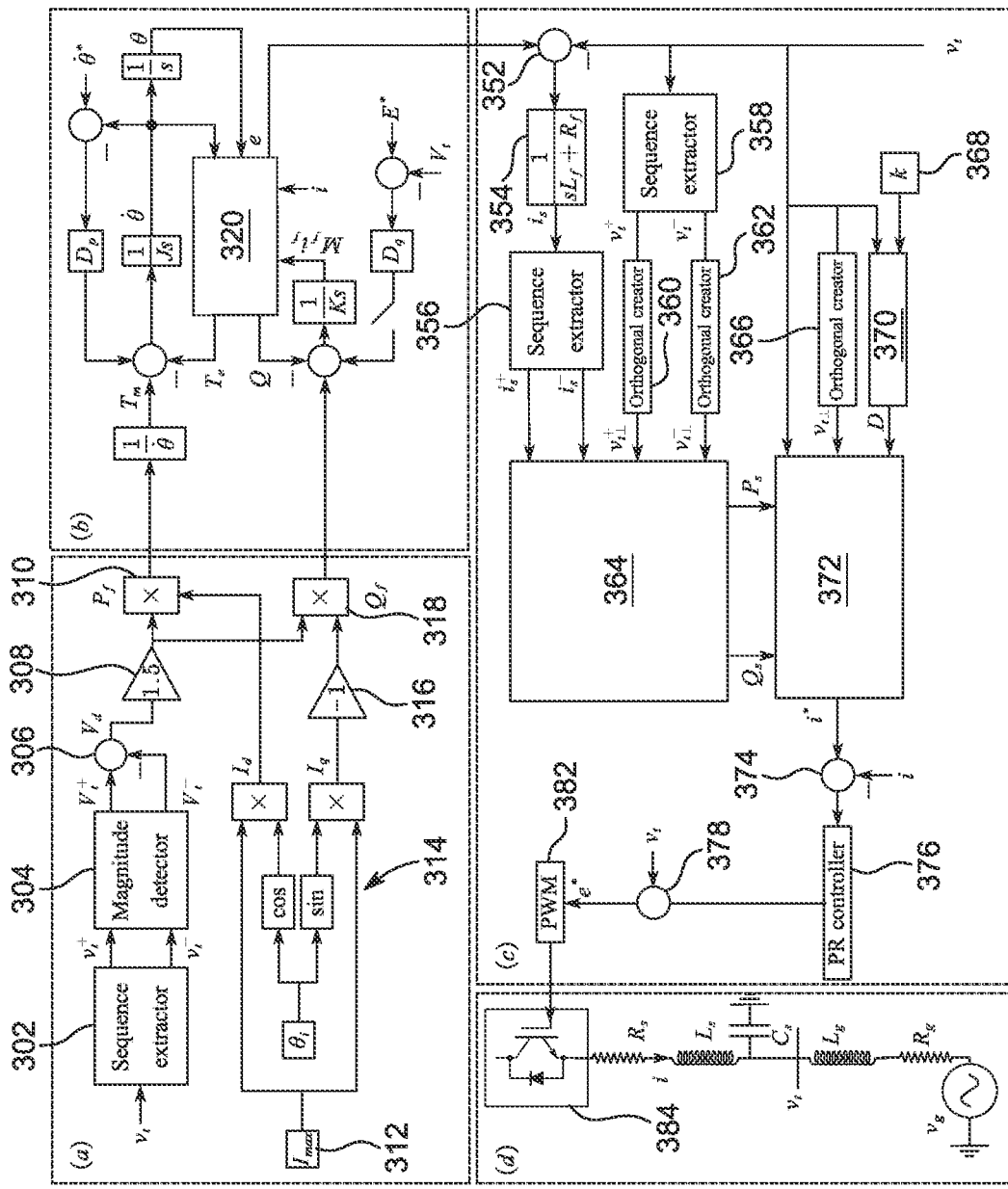
FIG. 3 illustrates a power reference generator to limit current (a), a generic SV control unit (b), a IARC and AARC subsystem (c) and a SV power unit (d).

FIG. 3a-FIG. 3d show the block diagram of a SV control unit designed with IARC and AARC strategies. FIG. 3(a) is a power reference generator to limit current that generates $P_f$ to replace $P_{set}$, and $Q_f$ to replace $Q_{set}$. The current limiter of FIG. 3(a) includes a sequence extractor 302 filters the $v_t$ and computes a positive sequence component $v_t^+$ and a negative sequence component $v_t^-$. A magnitude detector 304 coupled to the sequence extractor receives the positive sequence component $v_t^+$ and the negative sequence component $v_t^-$ to obtain a positive $v_t$ magnitude ($V_t^+$) and a negative $v_t$ magnitude ($V_t^-$). The positive $v_t$ magnitude ($V_t^+$) and a negative $v_t$ magnitude ($V_t^-$) are provided to an adder 306 to generate $V_d$. The $V_d$ is input to a multiplier 308 that multiplies 1.5 (3/2) to the $V_d$.

Further, a maximum peak current reference input 312 is provided to a d axis $v_t$ component generator 314 that generates $I_d$, and $I_q$ based on Equation (43). The $I_d$ is provided to a multiplier 310 that multiplies $I_d$ with product of the $V_d$ and 1.5 to generate $P_f$ as provided in Equation (41). Further, $I_q$ is multiplied with $-1$ by a multiplier 316 and provided to a multiplier 318. The multiplier 318 multiplies $-I_q$ with the product of the $V_d$ and 1.5 to generate $Q_f$ as provided in Equation (41).

The power references replacement ensures the required power delivery during normal conditions is identical if $P_{set}$ and $Q_{set}$ are used. Also, $P_f$ and $Q_f$ maintain the peak current during faults below a specific limit. Thus, $P_f$ and $Q_f$ may lead to a safe current generation and a reliable operation during normal and unbalanced conditions. FIG. 3(b) is a known generic SV control unit serially coupled to the current limiter and receives $P_f$ and $Q_f$ to produce e. The generic SV control unit includes a controller 320 that is substantially similar to the controllers 120 and 220, and implements the logic based at least in part upon Equations (3), (6) and (8). The generic SV control unit may be modified by adding a switch to disable the voltage droop relation since the SV operates in a grid-connected mode of operation. Also, leaving the added switch close may lead to unwanted reactive current generation during the faults.

For a traditional converter, IARC or AARC may be achieved by replacing $P_s$ and $Q_s$ in equations (26) and (32) by the active power and reactive power setpoints that deliver a required amount of power. For the SVs, $P_{set}$ and $Q_{set}$ are the power reference setpoints. However, it may not be possible to replace $P_s$ and $Q_s$ by $P_{set}$ and $Q_{set}$ since it leads to cancelation of the SV generic control unit. On the other hand, e may depend on $P_{set}$ and $Q_{set}$ as described in equations (1)-(8). Thus, it may be possible to generate $P_s$ and $Q_s$ from e by generating a current $i_s$ that is obtained from e and $v_t$ difference divided by the filter impedance as shown in FIG. 3(c). $P_s$ and $Q_s$ may be rewritten as $$P_s = v_t^+ \cdot i_s^+ + v_t^- \cdot i_s^- \tag{44}$$

$$Q_s = v_{t\perp}^+ \cdot i_s^+ + v_{t\perp}^- \cdot i_s^- \tag{45}$$

As seen in (44) and (45), and also in FIG. 3(c), sequence extractors 356 and 358 and orthogonal creators 360, 362 and 366 are used. The positive and negative sequence extractors 356 and 358 and the orthogonal creator 360, 362 and 366 are defined by taking $v_t$ as example:

$$v_t^+ = \begin{bmatrix} 1 & a & a^2 \\ a & 1 & a \\ a^2 & a & 1 \end{bmatrix} v_t \tag{46}$$

$$v_t^- = \begin{bmatrix} 1 & a^2 & a \\ a^2 & 1 & a^2 \\ a & a^2 & 1 \end{bmatrix} v_t \tag{47}$$

$$v_{t\perp} = \frac{1}{\sqrt{3}} \begin{bmatrix} 0 & 1 & -1 \\ -1 & 0 & 1 \\ 1 & -1 & 0 \end{bmatrix} v_t$$

In an example implementation, the current $i_s$ may be generated based on e and $v_t$ through an adder 352 that combines e and subtracts $v_t$ which is then provided to a component 354 to generate the current $i_s$. The current $i_s$ is input to the sequence extractor 356 to generate $i_s^+$ and $i_s^-$. The $i_s^+$ and $i_s^-$ are input to an internal power reference generator 364. Also using $v_t$, the sequence extractor 358 generates $v_t^+$ and $v_t^-$, that are input to the orthogonal creator 360 and the orthogonal creator 362 to generate $v_{t\perp}^+$ and $v_{t\perp}^-$, respectively. The $v_{t\perp}^+$ and $v_{t\perp}^-$ are provided to the internal power reference generator 364. The internal power reference generator 364 generates $P_s$ and $Q_s$ as described in Equations (44) and (45). The $P_s$ and $Q_s$ are input to an IARC and AARC reference current generator unit 372. Since the $P_s$ and $Q_s$ are generic for both IARC and AARC, and switching between these FRT strategies is related to the cosine term, i* can be rewritten to switch flexibly between IARC and AARC as:

$$i^* = \frac{P * v_t + Q * v_{t\perp}}{D}; \tag{48}$$

where $D=|v_t^+|^2+|v_t^-|^2+2k|v_t^+|\|v_t^-|\cos(2\omega t+\phi^++\phi^-)$ (49)

The parameter k in the denominator D determines whether i* achieves IARC or AARC. Setting the parameter k to 1, the denominator is equal to the one in Equation (26), and hence achieving an IARC method. On the other hand, setting k to 0 makes the denominator as in (32), which consequently leads to an AARC method. Thus, D is defined as:

$$D = \begin{cases} |v_t^+|^2 + |v_t^-|^2 + 2|v_t^+||v_t^-|\cos(2\omega t + \phi^+ + \phi^-) & k=1 \\ |v_t^+|^2 + |v_t^-|^2 & k=0 \end{cases} \tag{50}$$

The IARC and AARC reference current generator unit 372 generates i* based on $P_s$ and $Q_s$, $v_t$, $v_{t\perp}$ (received from the orthogonal creator 366), and D (received from component 370 based on $v_t$ and k input 368). For the control purpose design, creating D when k=1 is relatively complicated since it involves phase estimation. Thus, a more straightforward approach is followed by using D when k=1 as $$D = v_{ta}^2 + v_{tb}^2 + v_{tc}^2 \tag{51}$$

where $v_{ta}$, $v_{tb}$, and $v_{tc}$, are the abc quantities of $v_t$. The generated i* from IARC or IARC is tracked by i through subtractor 374 and proportional-resonant (PR) controller 376 along with feedforward $v_t$ to obtain through adder 378 the new EMF vector e* to create PWM signals through PWM 382. FIG. 3(d) is a power part that receives PWM signals to trigger the power electronic switches 384.

Figure 4:
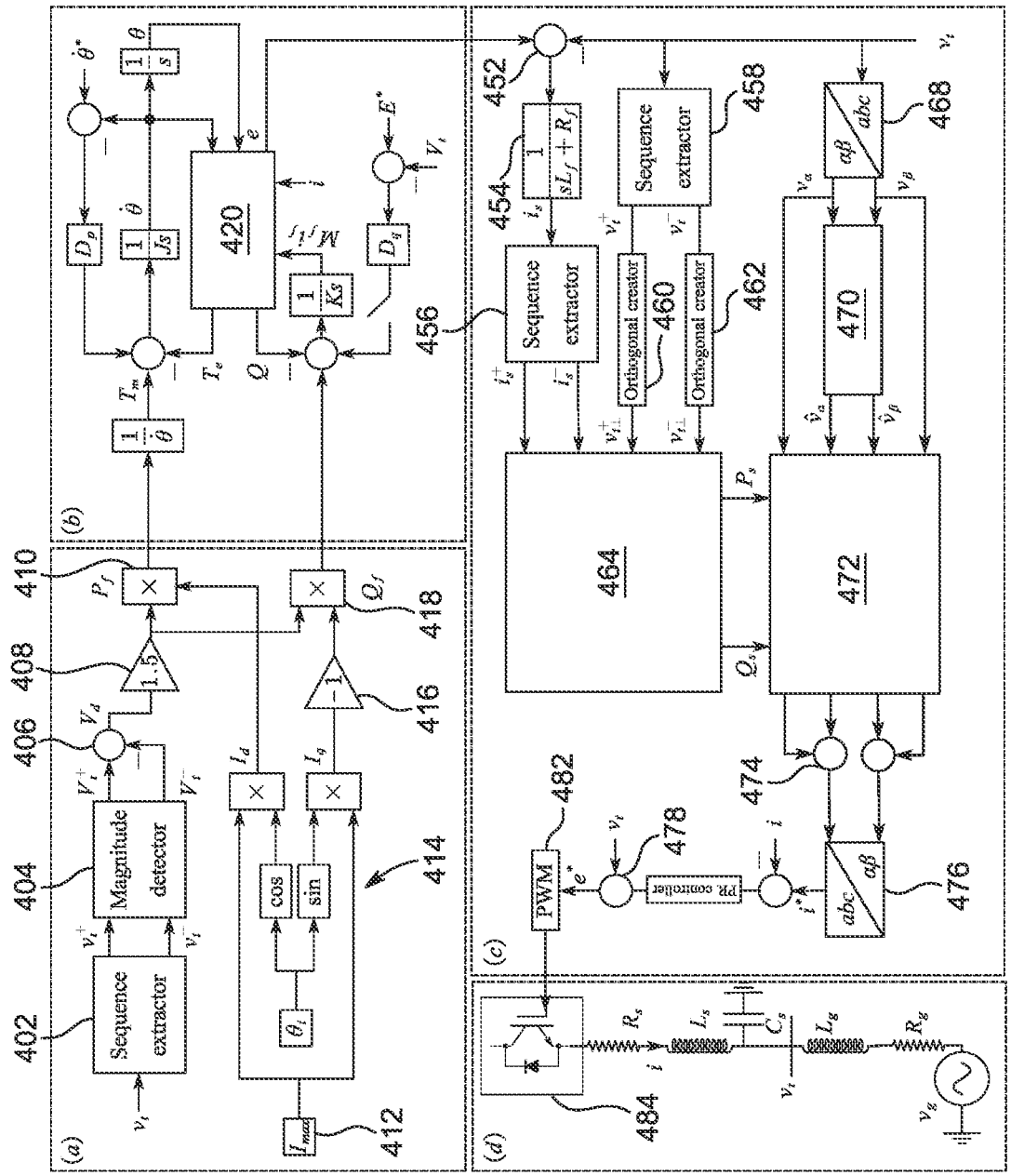
FIG. 4 illustrates a power reference generator to limit the current (a), a Generic SV control unit (b), a Comprehensive IARC (C-IARC) subsystem, according to one or more embodiments (c), and a SV power unit (d).

The implementation of the proposed C-IARC is done similarly to the IARC and AARC implementation. FIG. 4(a)-FIG. 4(d) illustrate a block diagram of the implemented C-IARC. FIG. 4(a) illustrates a substantially similar power reference generator of FIG. 3(a) used in providing a generic SV control unit (of FIG. 4(b)) with active and reactive power references that ensure safe and reliable current generation. The power reference generator of FIG. 4(a) includes a sequence extractor 402 filters the $v_t$ and computes a positive sequence component $v_t^+$ and a negative sequence component $v_t^-$. A magnitude detector 404 coupled to the sequence extractor receives the positive sequence component $v_t^+$ and the negative sequence component $v_t^-$ to obtain a positive $v_t$ magnitude $(V_t^+)$ and a negative $v_t$ magnitude $(V_t^-)$. The positive $v_t$ magnitude $(V_t^+)$ and a negative $v_t$ magnitude $(V_t^-)$ are provided to an adder 406 to generate $V_d$. The $V_d$ is input to a multiplier 408 that multiplies 1.5 (3/2) to the $V_d$. Further, a maximum peak current component reference 412 input is provided to a d axis $v_t$ component generator 414 that generates $I_d$, and $I_q$ based on Equation (43). The $I_d$ is provided to a multiplier 410 that multiplies $I_d$ with product of the $V_d$ and 1.5 to generate $P_f$ as provided in Equation (41). Further, $I_q$ is multiplied with $-1$ by a multiplier 416 and provided to a multiplier 418. The multiplier 418 multiplies $-I_q$ with the product of the $V_d$ and 1.5 to generate $Q_f$ as provided in Equation (41).

FIG. 4(b) is a known generic SV control unit serially coupled to the current limiter and receives $P_f$ and $Q_f$ to produce e. The generic SV control unit includes a controller 420 that is substantially similar to the controllers 120, 220 and 320, and implements the logic based at least in part upon Equations (3), (6) and (8). The generic SV control unit may be modified by adding a switch to disable the voltage droop relation since the SV operates in a grid-connected mode of operation.

In an example implementation, the current $i_s$ may be generated based on e and $v_t$ through an adder 452 that combines e and subtracts $v_t$ which is then provided to a component 454 to generate the current $i_s$. The current $i_s$ is input to a sequence extractor 456 to generate $i_s^+$ and $i_s^-$. The $i_s^+$ and $i_s^-$ are input to an internal power reference generator 464. Also using $v_t$, the sequence extractor 458 generates $v_t^+$ and $v_t^-$, that are input to an orthogonal creator 460 and the orthogonal creator 462 to generate $v_{t\perp}^+$ and $v_{t\perp}^-$, respectively. The $v_{t\perp}^+$ and $v_{t\perp}^-$ are provided to an internal power reference generator 464. The internal power reference generator 464 generates $P_s$ and $Q_s$ as described in Equations (44) and (45). The $P_s$ and $Q_s$ are input to a reference current generator unit 472.

The modifications made in FIG. 4(c) are related to generation of i* that achieves C-IARC based on equation (40) and the modified power estimator of equation (26). The $v_t$ is transformed to the αβ frame to produce $v_\alpha$ and $v_\beta$ through an αβ transform component 468. Then, both of $v_\alpha$ and $v_\beta$ are shifted by π/2 and 3π/2 respectively by a phase shifter component 470 based on the equation (37) and the equation (38) to create $\hat{v}_\alpha$ and $\hat{v}_\beta$. The C-IARC reference current generated by the reference current generator unit 472 from the equation (40) is in the αβ frame as $i_\alpha^*$ and $i_\beta^*$ which are transformed to their equivalent abc quantities through an abc transform component 476 to produce i* that achieves C-IARC. A PR controller is used to regulate i and, using a feedforward of $v_t$ to produce e* through adder 478 to control the electronic switches 484 of the power part of FIG. 4(d) through PWM 482.

Simulation results are described henceforth. In an example, using a MATLAB/SIMULINK, a simulation model is built to simulate the SV topology in FIG. 1. Table I shows the simulation model parameters.

TABLE I

PARAMETERS OF THE SIMULATION MODEL

| Parameter | Value | Parameter | Value |
| --- | --- | --- | --- |
| $S_{rated}$ | 4 MVA | $\tau_f$ | 0.002 s |
| $P_{set}$ | 3.6 MW | $\tau_v$ | 0.02 s |
| $Q_{set}$ | 1.74 MVAR | $V_{DC}$ | 784 V |
| E* | 480 V | $R_s$ | 0.003 Ω |
| f | 60 Hz | $L_s$ | 0.047 mH |

Figure 5:
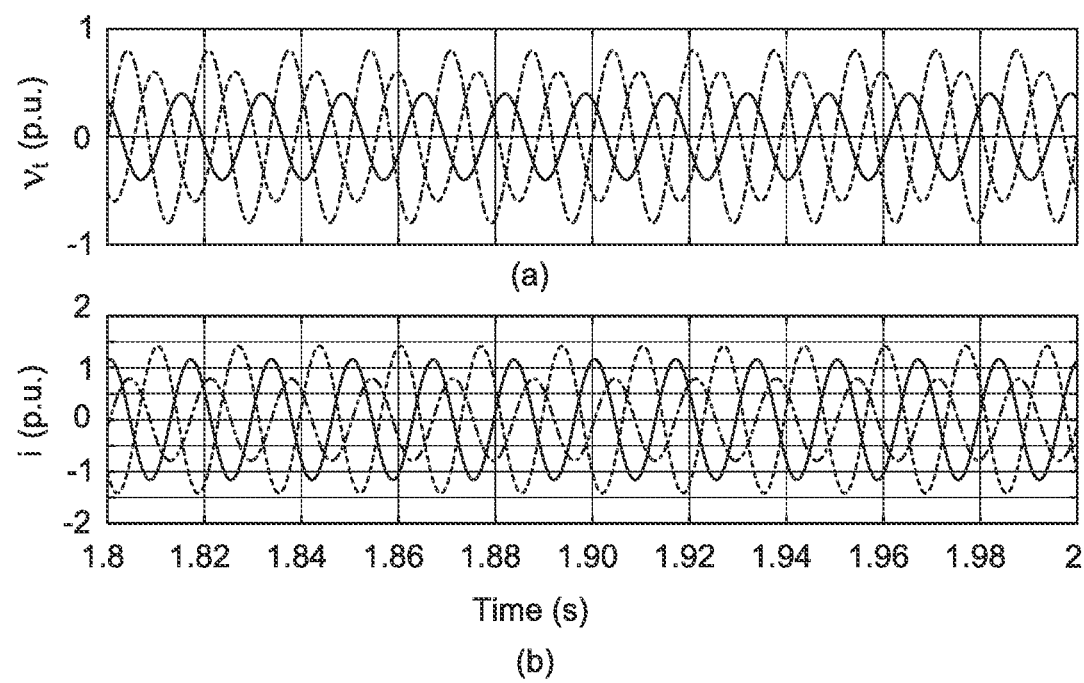
FIG. 5 illustrates a measured terminal voltage for a generic SV during an unbalanced grid conditions (a) and a generated current for the generic SV during an unbalanced grid conditions (b).

The simulated SV may be subjected to an unbalanced grid condition at its terminal. FIG. 5(a) shows the measured $v_t$. The nominal value of the peak current during normal conditions to track the active and reactive power setpoint is 0.667 p.u. During the unbalanced condition, the SV generates current higher than its nominal values to maintain P and Q tracking to $P_{set}$ and $Q_{set}$. FIG. 5(b) shows the generated current with a peak of almost 1.5 p.u. which is about 250% of the rated peak current value. This overcurrent condition coincides with the current mathematical model derived in the equation (9) that indicates that the SV current is not limited. Also, during the same unbalanced grid condition, P and Q experience oscillations shown in FIG. 6(a) and FIG. 6(b), which demonstrate that P and Q have oscillations at (2ω) that agree with (12) and (13) since the time difference between any two adjacent peaks is 8.33 ms. Thus, the simulation demonstrates that SV is unprotected against high current generation, and its active power and reactive power oscillate at (2ω) during unbalanced conditions.

Figure 6:
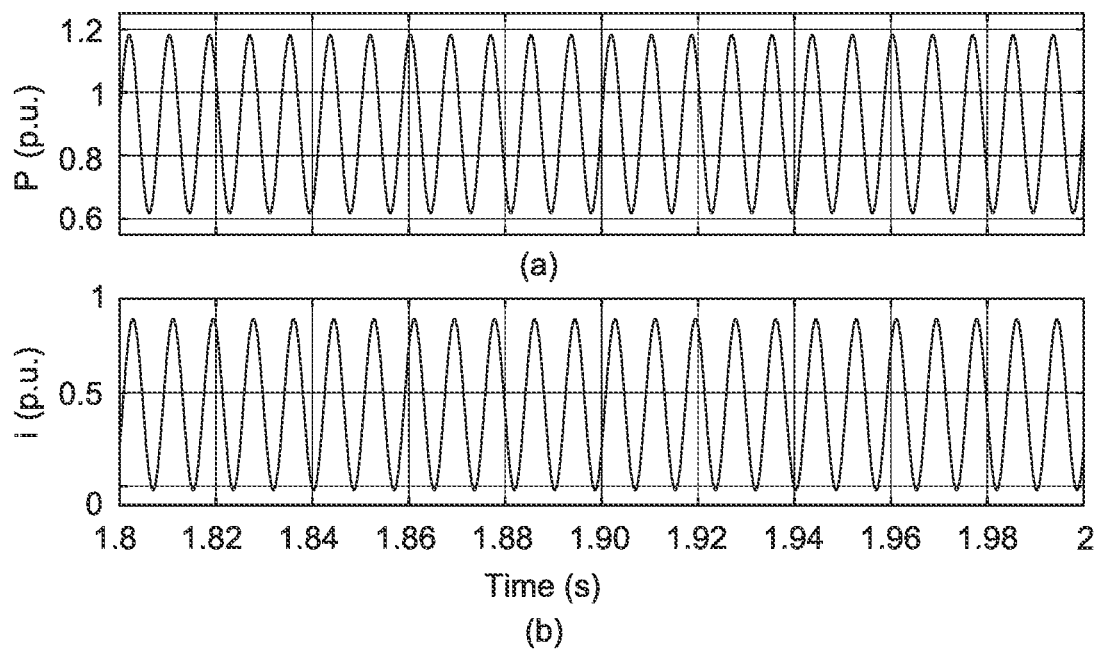
FIG. 6 illustrates a measured active power of the SV during an unbalanced grid conditions (a) and a measure reactive power for the SV during an unbalanced grid conditions (b).
Figure 7:
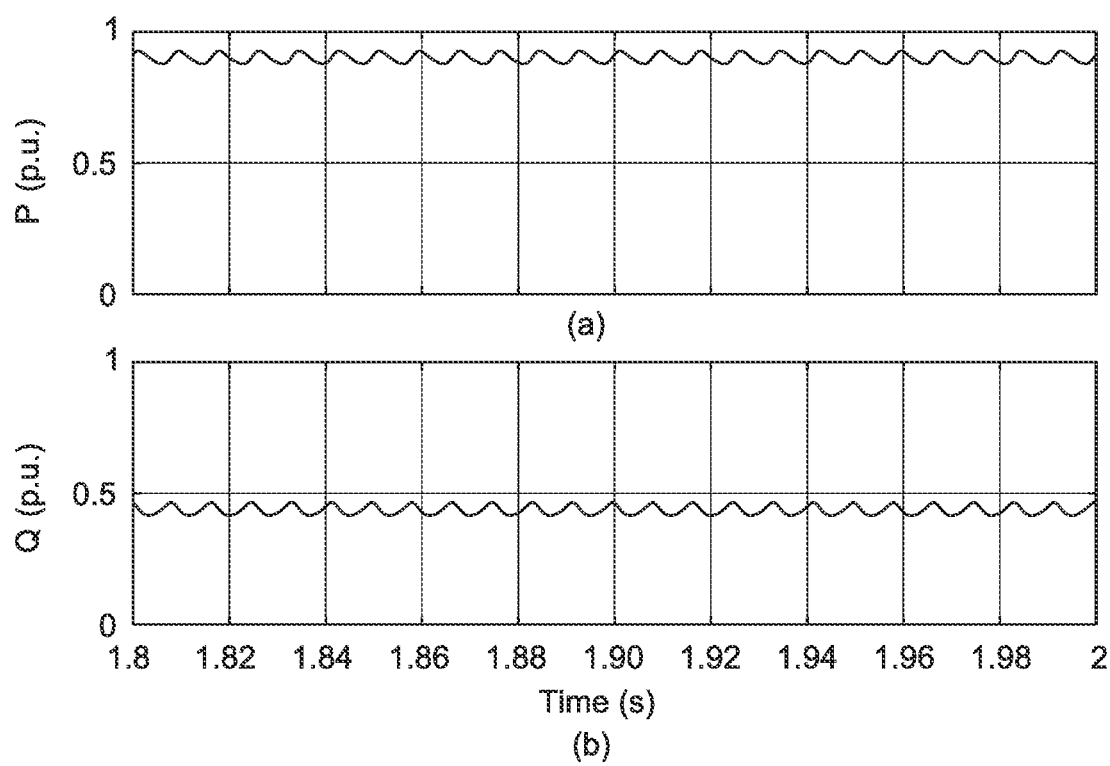
FIG. 7 illustrates a measured active power of the SV with the IARC during an unbalanced grid conditions, according to one or more embodiments (a) and a measure reactive power for the SV with the IARC during the unbalanced grid conditions, according to one or more embodiments (b).
Figure 8:
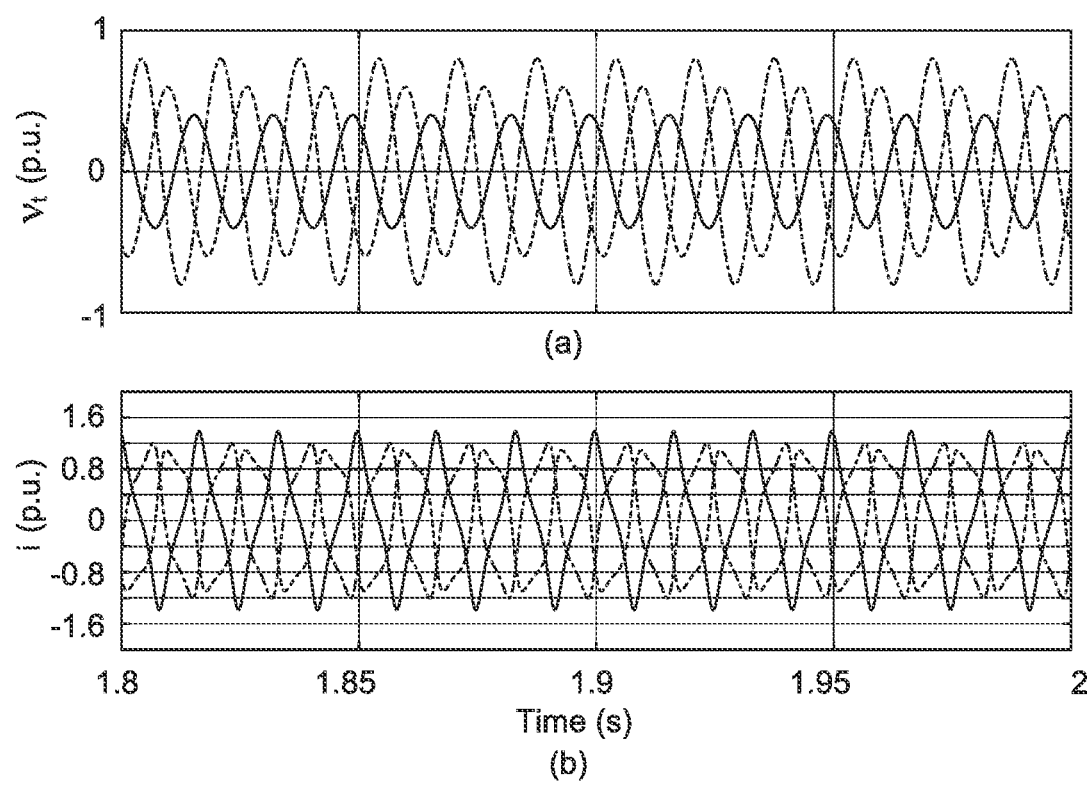
FIG. 8 illustrates a measured terminal voltage for the SV with the IARC during an unbalanced grid conditions, according to one or more embodiments (a) and a generated current for the SV with the IARC during an unbalanced grid conditions, according to one or more embodiments (b).

The generic SV simulation model described above is modified to include the IARC and AARC units to resolve a problem of the power oscillations demonstrated in FIG. 6(a) and FIG. 6(b). The proposed SV with the IARC may be tested under the same conditions that the generic SV is tested. FIG. 7(a) shows the generated P and FIG. 7(b) shows the generated Q during the unbalanced condition. As seen in the FIG. 7(a) and FIG. 7(a), the oscillations are significantly reduced as compared to the generic SV unit. The generated current due to the IARC method is depicted in FIG. 8(a) and FIG. 8(b) have a peak that exceeds the desired limit as well as the current waveform is not sinusoidal. By enabling the current limitation of the disclosure through the introduction of $P_f$ and $Q_f$, the peak current may be limited to the desired value, which is 0.8 p.u. as highlighted by the black dashed line of FIG. 8(b).

Figure 9:
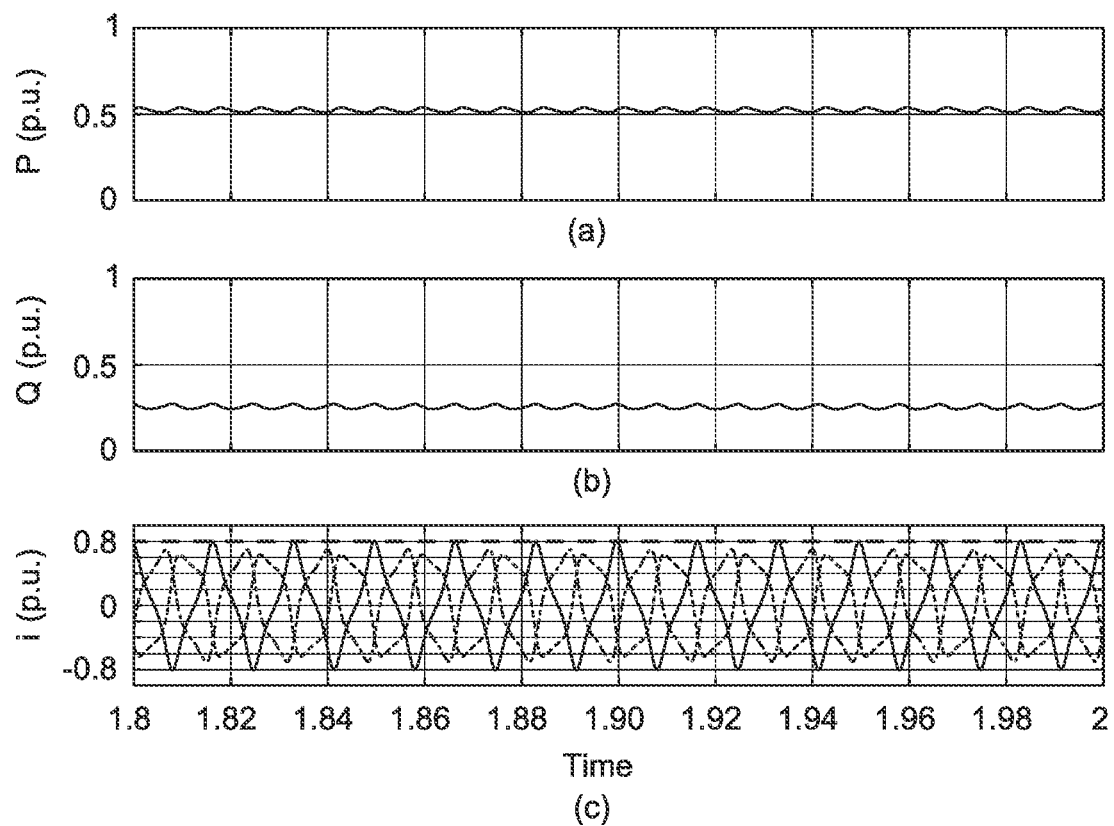
FIG. 9 illustrates a measured active power of the SV with the IARC and a current limiter, during an unbalanced grid conditions, according to one or more embodiments (a), a measure reactive power for the SV with the IARC and the current limiter during the unbalanced grid conditions, according to one or more embodiments (b), and a generated current for the SV with the IARC and the current limiter, during the unbalanced grid conditions, according to one or more embodiments (c).
Figure 10:
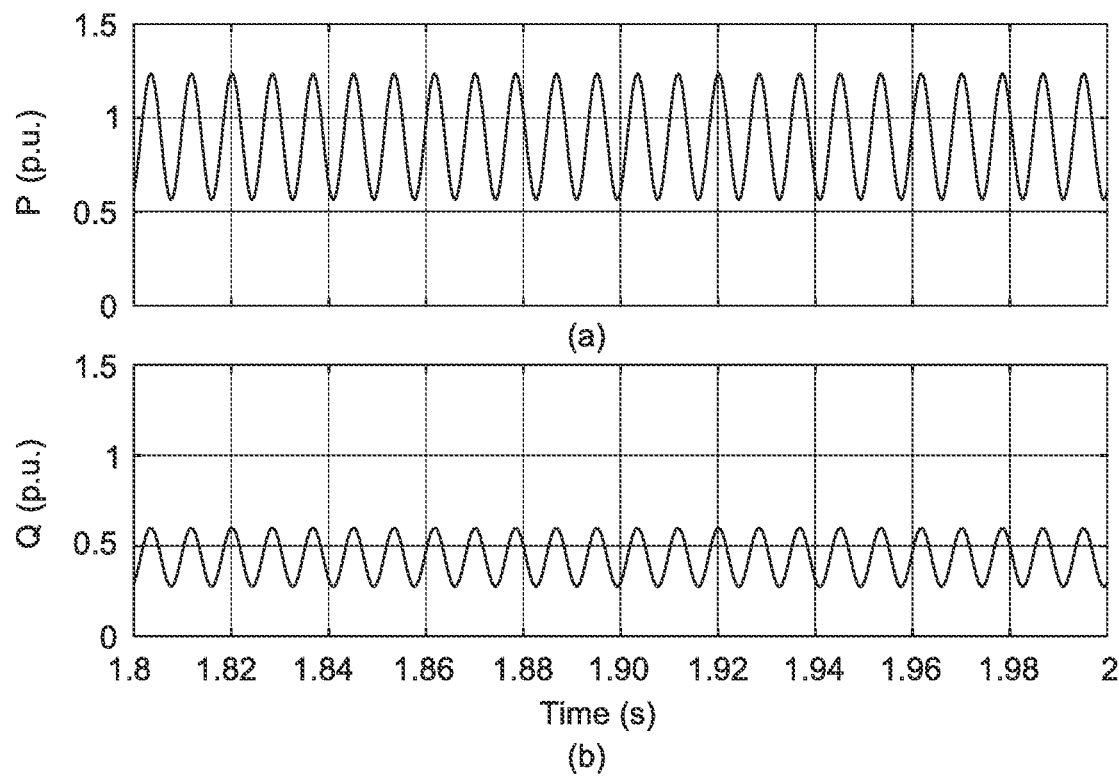
FIG. 10 illustrates a measured active power of the SV with the AARC during an unbalanced grid conditions, according to one or more embodiments (a) and a measure reactive power for the SV with the AARC during the unbalanced grid conditions, according to one or more embodiments (b).
Figure 11:
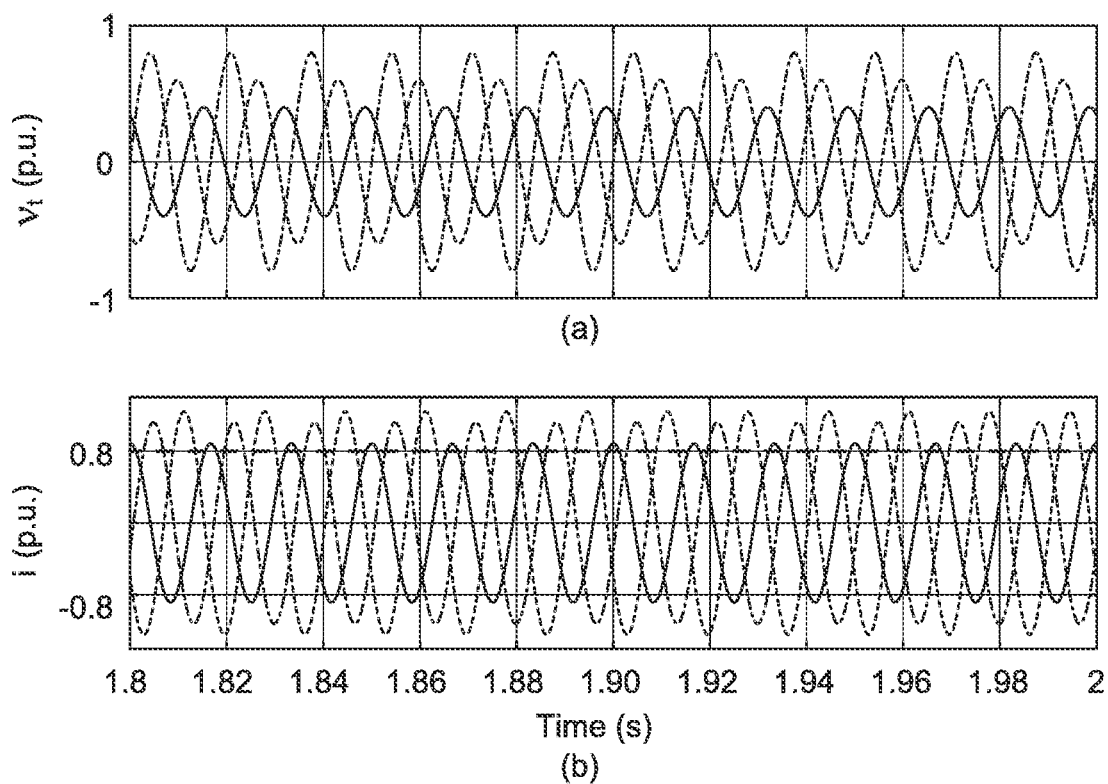
FIG. 11 illustrates a SV measured terminal voltage for the SV with the AARC during an unbalanced grid conditions, according to one or more embodiments (a) and a SV generated current for the SV with the AARC during an unbalanced grid conditions, according to one or more embodiments (b).
Figure 12:
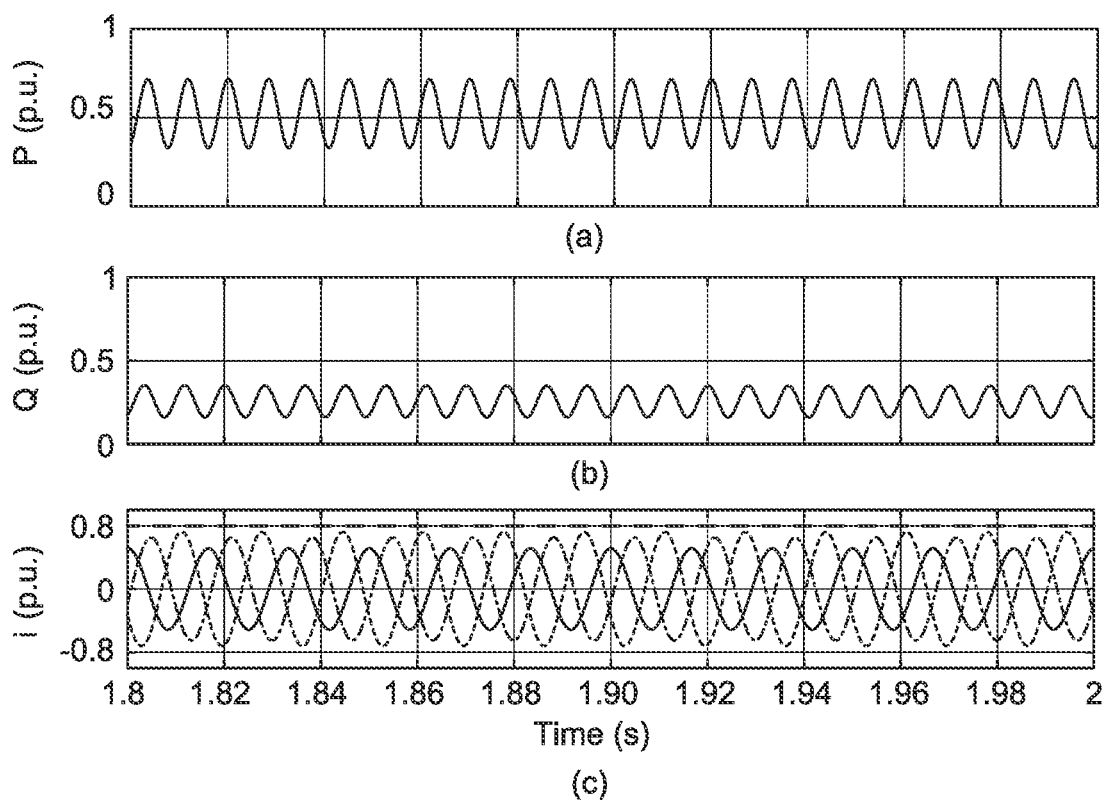
FIG. 12 illustrates a measured active power of the SV with the AARC and a current limiter, during an unbalanced grid conditions, according to one or more embodiments (a), a measure reactive power for the SV with the AARC and the current limiter during the unbalanced grid conditions, according to one or more embodiments (b), and a generated current for the SV with the AARC and the current limiter, during the unbalanced grid conditions, according to one or more embodiments (c).

FIG. 9(a) shows P, FIG. 9(b) shows Q, and FIG. 9(c) shows i of the SV-IARC with the current limitation that successfully limited the current. However, it is expected to have P and Q less than their corresponding setpoints, i.e., 0.9 p.u. and 0.435 p.u., due to the current limitation action. The AARC may be designed to avoid generating the distorted current of the IARC that is shown in FIG. 8(b) and FIG. 9(c). The active power generation and the reactive power generation of the AARC are shown in FIG. 10(a) and FIG. 10(b), respectively. Also, a SV measure terminal voltage and SV current generation with AARC during an unbalanced grid conditions are shown in FIG. 11(a) and FIG. 11(b), respectively. From FIG. 10(a), FIG. 10(b), FIG. 11(a) and FIG. 11(b), it is concluded that the AARC restores the sinusoidal shape of the generated current. However, the active and reactive power may have oscillations. Also, the current may exceed the desired limit, i.e., 0.8 p.u. Engaging the current limitation of the disclosure by modifying the power references can limit the peak current to the desired value. FIG. 12(a), FIG. 12(b) and FIG. 12(c) show the active power, reactive power, and current generation with the current limitation, respectively. As expected, the power generation drops due to the current limitation, but the peak successfully remains under the desired limit.

Figure 13:
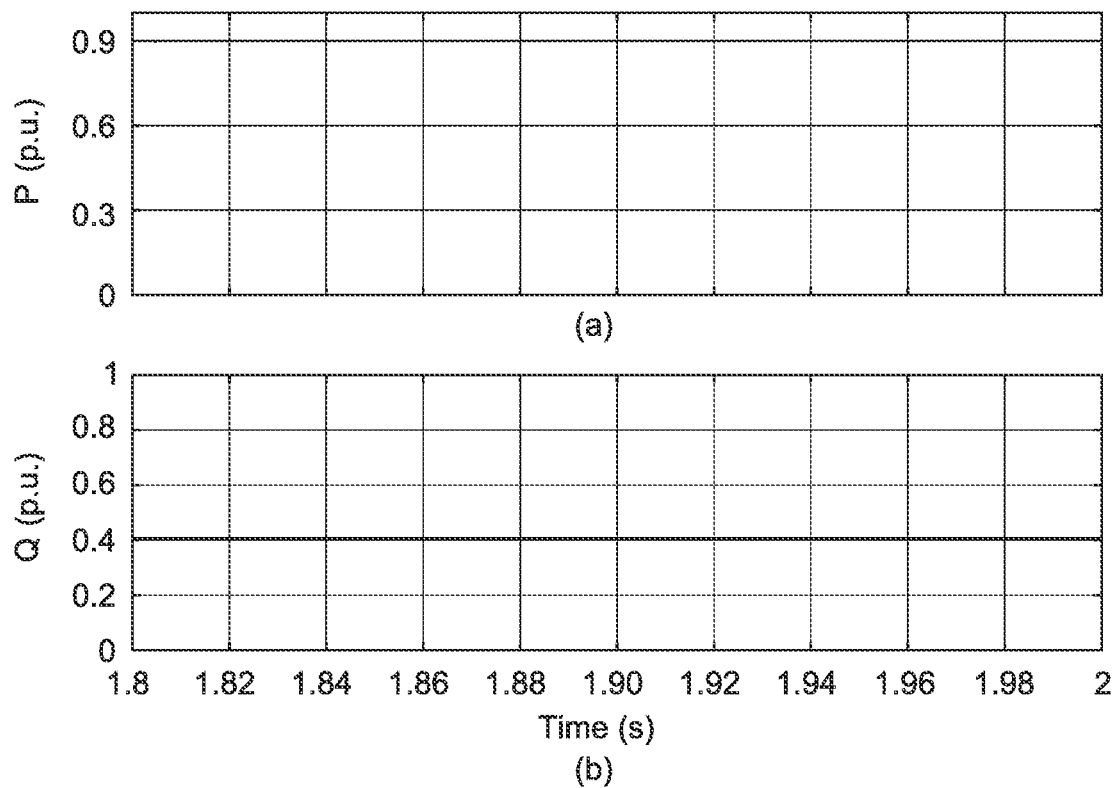
FIG. 13 illustrates an SV measured voltage for the C-IARC during the unbalanced grid conditions, according to one or more embodiments (a) and an SV generated current for the C-IARC during the unbalanced grid conditions, according to one or more embodiments (b).
Figure 14:
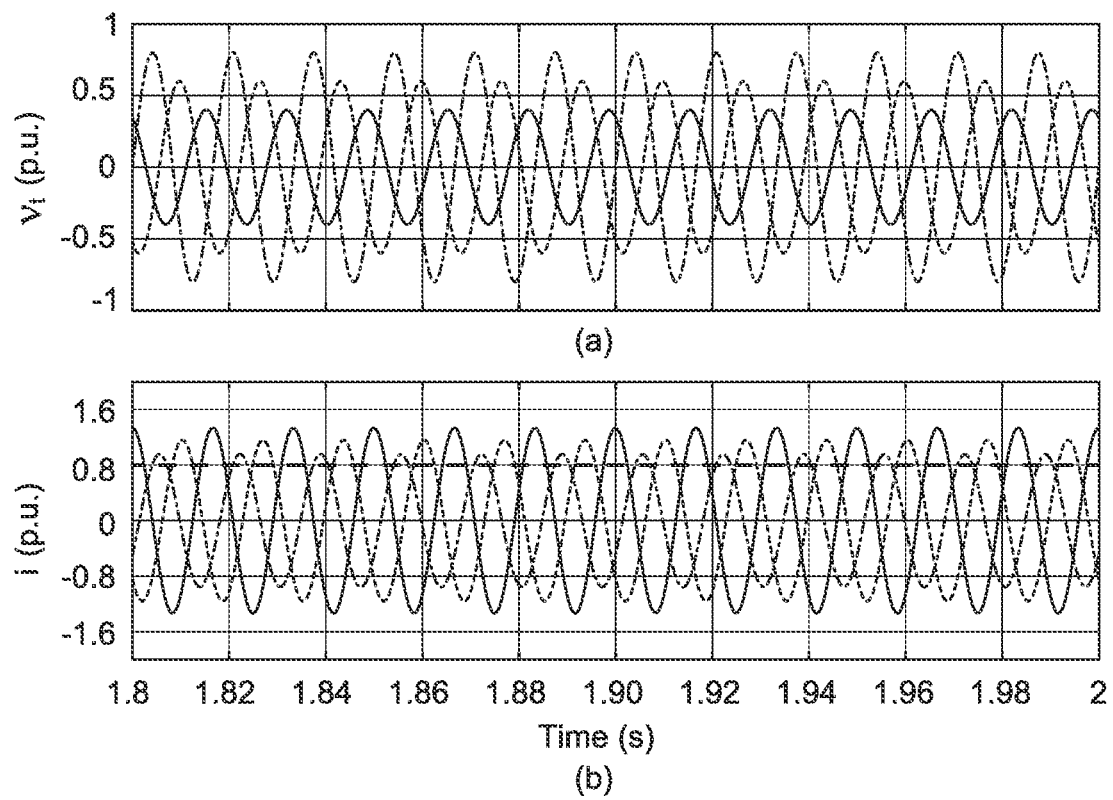
FIG. 14 illustrates an SV measured terminal voltage for the C-IARC during an unbalanced grid conditions, according to one or more embodiments (a) and an SV generated current for the C-IARC during an unbalanced grid conditions, according to one or more embodiments (b).
Figure 15:
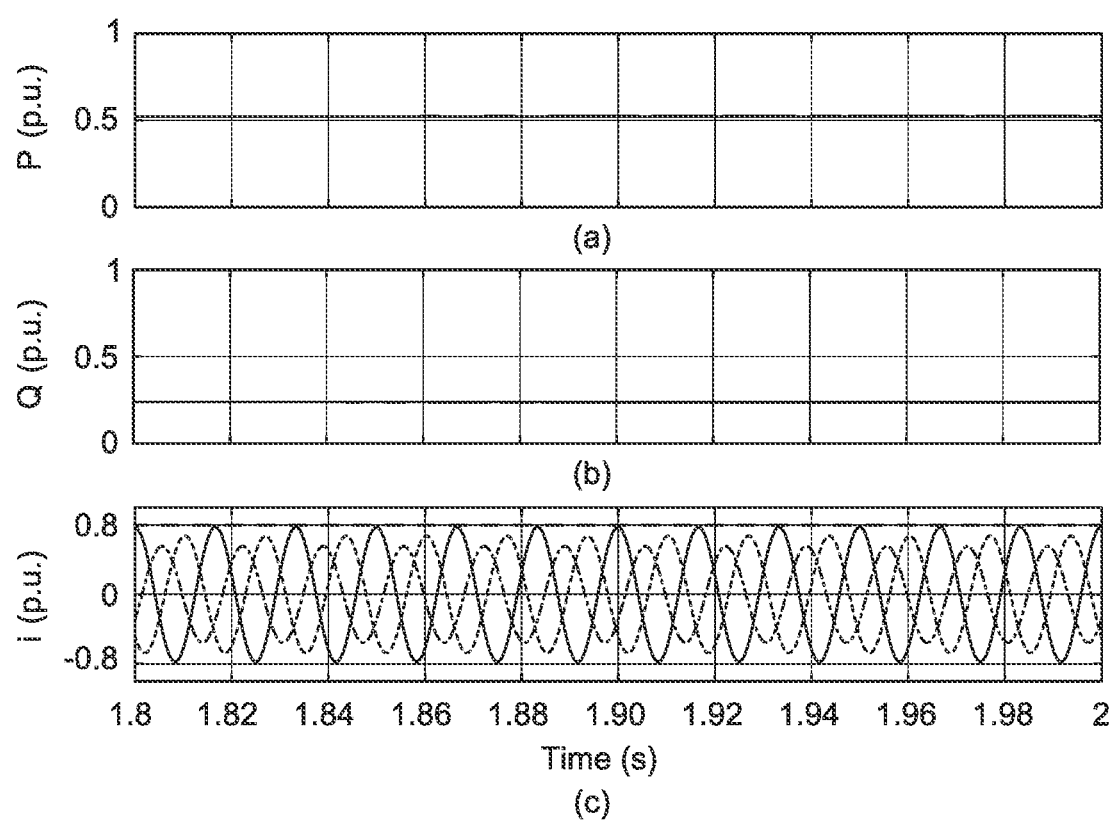
FIG. 15 illustrates a measured active power of the C-IARC with the current limiter, during an unbalanced grid conditions, according to one or more embodiments (a), a measured reactive power for the SV the C-IARC with the current limiter during the unbalanced grid conditions, according to one or more embodiments (b), and a generated current for the C-IARC with the current limiter, during the unbalanced grid conditions, according to one or more embodiments (c).

The results of the IARC and AARC show the advantages and disadvantages for both. C-IARC merges the advantages of IARC and AARC while discarding their disadvantages, that is, power oscillations and distorted current generation. FIG. 13(a) and FIG. 13(b) show an SV measured voltage and an SV generated current for C-IARC, respectively. As evident, the power oscillations may be significantly eliminated without affecting the terminal voltage and generated current waveform shown in FIG. 14(a) and FIG. 14(b), respectively. Also, C-IARC further removes the remaining small portion of the power oscillations that IARC could not remove. The overcurrent conditions in FIG. 14(b) are avoided as shown in FIG. 15(a), FIG. 15(b) and FIG. 15(c) by the current limitation of the disclosure that successfully limits the current to a value equal to the desired limit, which is 0.8 p.u. Also, the power generation, similar to the previous strategies, drops due to the current limitation.

The disclosure provides a seamless FRT strategies. The addition of the FRT to the SV control unit does not affect the normal operation of the SV control unit. Thus, the SV intrinsic features are unaffected. The current limitation of the disclosure may be suitable for a generic SV as well as SV with the FRT strategies. The activation of the current limitation and any proposed FRTs strategies is a seamless transition process without requiring any switching. Thus, the SV stability may not be affected by any switching action. The IARC and AARC are flexibly coupled to achieve power oscillation reduction or current harmonic elimination. The C-IARC eliminates the power oscillations and current harmonics simultaneously. Further, there is no requirement to control the sequence components and add complexity to the SV control unit with the FRT strategies. Further, no hardware modification may be required for the current SV control unit.

It is understood that the examples, embodiments and teachings presented in this application are described merely for illustrative purposes. Any variations or modifications thereof are to be included within the scope of the present application as discussed.

The invention claimed is:

1. A system for synchronverter power control comprising:
a synchronverter coupled with a power supply grid;
a power reference generator, configured to receive a terminal voltage measurement vector $v_t$ and a current measurement vector i from the synchronverter, and generate an active power $P_f$ and a reactive power $Q_f$;
a synchronverter control unit connected to the power reference generator and configured to generate, based on a processing of the active power $P_f$ and the reactive power $Q_f$, an electromotive force (EMF) vector e; and
an active and reactive power control unit, connected between the synchronverter control unit and the synchronverter, configured to receive the EMF vector e and the terminal voltage measurement vector $v_t$ and based on the EMF vector e and the terminal voltage measurement vector $v_t$ to regulate the current measurement vector i to eliminate power oscillations and current harmonics in the synchronverter during unbalanced grid conditions.

2. The system of claim 1, wherein the active power $P_f$ and the reactive power $Q_f$ are given by:

$$P_f = \frac{3}{2} V_d I_d \quad Q_f = -\frac{3}{2} V_d I_q$$

where
$V_d$ is a d-axis voltage magnitude,
$I_d$ is a d-axis current magnitude, and
$I_q$ is a q-axis current magnitude.

3. The system of claim 2 wherein the power reference generator is further configured to:
generate the d-axis voltage magnitude $V_d$ based at least in part on the terminal voltage measurement vector $v_t$; and
generate, based at least in part on a provided maximum peak current reference input and an angle of a provided required power factor input, the d-axis current magnitude $I_d$ and the q-axis current magnitude $I_q$.

4. The system of claim 1, wherein the active and reactive power control unit is further configured wherein to regulate the current measurement vector i comprises to:
generate, based on the EMF vector e and the terminal voltage measurement vector $v_t$, a constant active power Ps and a constant reactive power $Q_s$,
generate, based at least in part on the constant active power Ps and the constant reactive power $Q_s$, a reference current i*,
regulate the current measurement vector i based at least in part on a difference between the reference current i* and the current measurement vector i, and
generate the constant active power Ps and the constant reactive power $Q_s$ in a manner wherein
the $P_s$ is given by $P_s = v_t^+ \cdot i^+ + v_t^- \cdot i^-$, and
the $Q_s$ is given by: $Q_s = v_{t\perp}^+ \cdot i^+ + v_{t\perp}^- \cdot i^-$,
where:
$i^+$ is a positive current component value of the current measurement vector i,
$i^-$ is a negative current component value of the current measurement vector i,
$v_t^+$ is a positive sequence component of the terminal voltage measurement vector $v_t$,
$v_t^-$ is a negative sequence component of the terminal voltage measurement vector $v_t$,
$v_{t\perp}^+$ is a positive orthogonal sequence component of $v_t^+$, and
$v_{t\perp}^-$ is a negative orthogonal sequence component of $v_t^-$.

5. The system of claim 4, wherein the active and reactive power control unit is further configured to selectively switch between an instantaneous active and reactive power control (IARC) reference current generator functionality and an average active and reactive power control (AARC) reference current generator functionality, and is configured to generate the reference current i* using:

$$i^* = \frac{P * v_t + Q * v_{t\perp}}{D};$$

where $$D = \begin{cases} |v_t^+|^2 + |v_t^-|^2 + 2|v_t^+||v_t^-|\cos(2\omega t + \phi^+ + \phi^-) & k = 1 \\ |v_t^+|^2 + |v_t^+|^2 & k = 0 \end{cases}$$

P=P$_s$, Q=Q$_s$,

φ$^+$ is a phase of v$_t^+$,

φ$^-$ is a phase of v$_t^-$, and

ω is a fundamental frequency of the power supply grid, wherein setting k=1 causes the active and reactive power control unit to switch to the IARC functionality, and wherein setting k=0 causes the active and reactive power control unit to switch to the AARC reference current generator functionality.

6. The system of claim 5, wherein:

the active and reactive power control unit further comprises a proportional-resonant (PR) controller, configured to track the reference current i* generated by the IARC reference current generator functionality, and the active and reactive power control unit is further configured to obtain a new EMF vector e*, based on a feedforwarding of the terminal voltage measurement vector v$_t$ in combination with the tracking the reference current i* generated by the IARC functionality, and to generate, based on the new EMF vector e*, Pulse Width Modulation (PWM) signals.

7. The system of claim 6, wherein the active and reactive power control unit is further configured to control, via the PWM signals, power electronic switches of a synchronverter power unit.

8. The system of claim 4, wherein the active and reactive power control unit comprises a comprehensive IARC (C-IARC), and the C-IARC comprises:

an αβ transform component configured to transform, via a processing, the terminal voltage measurement vector v$_t$ to an αβ frame, as a v$_\alpha$ and a v$_\beta$, wherein the v$_\alpha$ and v$_\beta$ are the αβ frame quantities of v$_t$;

a phase shifter component configured to shift v$_\alpha$ by $$\frac{\pi}{2}$$

and shift v$_\beta$ by $$\frac{3\pi}{2}$$

generating $\hat{v}_\alpha$ and $\hat{v}_\beta$, respectively;

a reference current generator unit configured to generate a C-IARC reference current in αβ frame as quantities $\hat{i}_\alpha^*$ and $\hat{i}_\beta^*$ based on the v$_\alpha$, the v$_\beta$, the $\hat{v}_\alpha$ and the $\hat{v}_\beta$, in accordance with:

$$\begin{bmatrix} \hat{i}_\alpha^* \\ \hat{i}_\beta^* \end{bmatrix} = \frac{2}{3} \begin{bmatrix} v_\alpha & v_\beta \\ \hat{v}_\alpha & -\hat{v}_\beta \end{bmatrix}^{-1} \begin{bmatrix} P_S \\ Q_S \end{bmatrix} = \begin{bmatrix} \hat{i}_{\alpha(p)}^* + \hat{i}_{\alpha(q)}^* \\ \hat{i}_{\beta(p)}^* + \hat{i}_{\beta(q)}^* \end{bmatrix}$$

wherein $\hat{i}_{\alpha(p)}^*$ and $\hat{i}_{\alpha(q)}^*$ are sub-components of $\hat{i}_\alpha^*$, and wherein $\hat{i}_{\beta(p)}^*$ and $\hat{i}_{\beta(q)}^*$ are sub-components of $\hat{i}_\beta^*$; and an abc component configured to transform the $\hat{i}_\alpha^*$ and $\hat{i}_\beta^*$ to generate the reference current i* as the C-IARC reference current.

9. The system of claim 4 wherein the active and reactive power control unit is further configured to:

extract the positive current component value i$^+$ and the negative current component value i$^-$ from the current measurement vector i;

extract the positive sequence component v$_t^+$ and the negative sequence component v$_t^-$ from the terminal voltage measurement vector v$_t$;

generate, based on the positive sequence component v$_t^+$, the positive orthogonal sequence component v$_{t\perp}^+$; and generate, based on the negative sequence component v$_t^-$, the negative orthogonal sequence component v$_{t\perp}^-$.

10. The system of claim 1, further comprising a pulse width modulation (PWM) unit configured to trigger, based at least in part on the EMF vector e and the terminal voltage measurement vector v$_t$, power electronics switches of a synchronverter power unit coupled to the active and reactive power control unit.

11. A method for synchronverter power control comprising:

electrically coupling a synchronverter coupled with a power supply grid;

generating an active power P$_f$ and a reactive power Q$_f$ through a power reference generator based on a terminal voltage measurement vector v$_t$ and a current measurement vector i from the synchronverter;

generating an electromotive force (EMF) vector e through a synchronverter control unit by processing the active power P$_f$ and the reactive power Q$_f$; and regulating the current measurement vector i, wherein the regulating is based on the EMF vector e and the terminal voltage measurement vector v$_t$ and is configured to eliminate power oscillations and current harmonics in the synchronverter during unbalanced grid conditions and is performed through an active and reactive power control unit, connected between the synchronverter control unit and the synchronverter.

12. The method of claim 11, wherein the generating the active power P$_f$ and the reactive power Q$_f$ are in accordance with given by:

$$P_f = \frac{3}{2} V_d I_d \quad Q_f = -\frac{3}{2} V_d I_q$$

where

V$_d$ is a d-axis voltage magnitude,

I$_d$ is a d-axis current magnitude, and

I$_q$ is a q-axis current magnitude.

13. The method of claim 12 further comprising, by the power reference generator:

generating the d-axis voltage magnitude V$_d$ based at least in part on the terminal voltage measurement vector v$_t$; and generating, based at least in part on a provided maximum peak current reference input and an angle of a provided required power factor input, the d-axis current magnitude I$_d$ and the q-axis current magnitude I$_q$.

14. The method of claim 11, further comprising the active and reactive power control unit:

generating, based on the EMF vector e and the terminal voltage measurement vector v$_t$, a constant active power Ps and a constant reactive power Q$_s$, generating, based at least in part on the constant active power Ps and the constant reactive power Q$_s$, a reference current i*, regulating the current measurement vector i based at least in part on a difference between the reference current i* and the current measurement vector i, and
generating the constant active power Ps and the constant reactive power $Q_s$ in a manner
wherein the $P_s$ is given by $P_s = v_t^+ \cdot i^+ + v_t^- \cdot i^-$, and
the $Q_s$ is given by: $Q_s = v_{t\perp}^+ \cdot i^+ + v_{t\perp}^- \cdot i^-$,
where:
- $i^+$ is a positive current component value of the current measurement vector i,
- $i^-$ is a negative current component value of the current measurement vector i,
- $v_t^+$ is a positive sequence component of the terminal voltage measurement vector $v_t$,
- $v_t^-$ is a negative sequence component of the terminal voltage measurement vector $v_t$,
- $v_{t\perp}^+$ is a positive orthogonal sequence component of $v_t^+$, and
- $v_{t\perp}^-$ is a negative orthogonal sequence component of $v_t^-$.

15. The method of claim 14, further comprising selectively switching the active and reactive power control unit between an instantaneous active and reactive power control (IARC) reference current generator functionality and an average active and reactive power control (AARC) reference current generator functionality, and the generating the reference current i* is in accordance with:

$$i^* = \frac{P * v_t + Q * v_{t\perp}}{D};$$

where $$D = \begin{cases} |v_t^+|^2 + |v_t^-|^2 + 2|v_t^+||v_t^-|\cos(2\omega t + \phi^+ + \phi^-) & k = 1 \\ |v_t^+|^2 + |v_t^+|^2 & k = 0 \end{cases},$$

$P = P_s$, $Q = Q_s$,
$\phi^+$ is a phase of $v_t^+$,
$\phi^-$ is a phase of $v_t^-$,
$\omega$ is a fundamental frequency of the power supply grid,
k=1 corresponds to the IARC functionality,
k=0 corresponds to the AARC functionality.

16. The method of claim 15, further comprising:
tracking the reference current i* generated by the IARC functionality through a proportional-resonant (PR) controller,
obtaining, based on the tracking and a feedforwarding of $v_t$, a new EMF vector e*,
generating, based on the new EMF vector e*, Pulse Width Modulation (PWM) signals.

17. The method of claim 16, further comprising controlling, via the PWM signals, power electronics switches of a synchronverter power unit.

18. The method of claim 14, further comprising, by the active and reactive power control unit:
extracting the positive current component value $i^+$ and the negative current component value $i^-$ from the current measurement vector i;
extracting the positive sequence component $v_t^+$ and the negative sequence component $v_t^-$ from the terminal voltage measurement vector $v_t$;
generating based on the positive sequence component $v_t^+$ the positive orthogonal sequence component $v_{t\perp}^+$; and
generating based on the negative sequence component $v_t^-$ the negative orthogonal sequence component $v_{t\perp}^-$.

19. The method of claim 11, wherein the regulating the current measurement vector/comprises a regulating based on a comprehensive IARC (C-IARC), and the regulating based on the C-IARC comprises:
processing the terminal voltage measurement vector $v_t$ to transform $v_t$ to an $\alpha\beta$ frame as a $v_\alpha$ and a $v_\beta$, wherein the $v_\alpha$ and the $v_\beta$ are the $\alpha\beta$ frame quantities of $v_t$;
shifting $v_\alpha$ by $$\frac{\pi}{2}$$

and $v_\beta$ by $$\frac{3\pi}{2}$$

to generate $\hat{v}_\alpha$ and $\hat{v}_\beta$;
generating a C-IARC reference current in $\alpha\beta$ frame as quantities is $\hat{i}_\alpha^*$ and $\hat{i}_\beta^*$ based on the $v_\alpha$ and the $v_\beta$, the $\hat{v}_\alpha$, and the $\hat{v}_\beta$, in accordance with:

$$\begin{bmatrix} \hat{i}_\alpha^* \\ \hat{i}_\beta^* \end{bmatrix} = \frac{2}{3}\begin{bmatrix} v_\alpha & v_\beta \\ \hat{v}_\alpha & -\hat{v}_\beta \end{bmatrix}^{-1}\begin{bmatrix} P_S \\ Q_S \end{bmatrix} = \begin{bmatrix} \hat{i}_{\alpha(p)}^* + \hat{i}_{\alpha(q)}^* \\ \hat{i}_{\beta(p)}^* + \hat{i}_{\beta(q)}^* \end{bmatrix}$$

wherein $\hat{i}_{\alpha(p)}^*$ and $\hat{i}_{\alpha(q)}^*$ are sub-components of $\hat{i}_\alpha^*$, and wherein $\hat{i}_{\beta(p)}^*$ and $\hat{i}_{\beta(q)}^*$ are sub-components of $\hat{i}_\beta^*$; and
transforming the $\hat{i}_\alpha^*$ and $\hat{i}_\beta^*$ to generate the reference current i* as the C-IARC reference current in $\alpha\beta$ frame.

20. The method of claim 11, further comprising:
generating pulse width modulated (PWM) signals, based at least in part on the EMF vector e and a feedforward compensation using the terminal voltage measurement vector $v_t$; and
controlling, via the PWM signals, power electronics switches of a synchronverter power unit coupled to the active and reactive power control unit.

* * * * *